(12) United States Patent
Hanks

(10) Patent No.: US 8,391,309 B2
(45) Date of Patent: Mar. 5, 2013

(54) METHOD AND SYSTEM FOR USING MNEMONIC SYMBOLS TO PROVISION CHANNEL ATTRIBUTES WITH AN ATTRIBUTE MASK

(75) Inventor: William Turner Hanks, Carol Stream, IL (US)

(73) Assignee: ARRIS Group, Inc., Suwanee, GA (US)

( * ) Notice: Subject to any disclaimer, the term of this patent is extended or adjusted under 35 U.S.C. 154(b) by 740 days.

(21) Appl. No.: 12/034,609

(22) Filed: Feb. 20, 2008

(65) Prior Publication Data

US 2008/0250069 A1 Oct. 9, 2008

Related U.S. Application Data

(60) Provisional application No. 60/890,788, filed on Feb. 20, 2007.

(51) Int. Cl.
*H04L 12/28* (2006.01)
*G01R 31/08* (2006.01)

(52) U.S. Cl. ........ 370/431; 370/232; 370/252; 370/241; 370/438; 375/260; 709/230

(58) Field of Classification Search ................ 370/431, 370/232, 252, 241, 438; 707/104.1; 713/300, 713/310; 725/135; 375/260; 380/277; 709/230
See application file for complete search history.

(56) References Cited

U.S. PATENT DOCUMENTS

| | | | |
|---|---|---|---|
| 6,064,692 A * | 5/2000 | Chow | 375/219 |
| 6,289,464 B1 * | 9/2001 | Wecker et al. | 713/300 |
| 6,816,500 B1 * | 11/2004 | Mannette et al. | 370/431 |
| 6,999,772 B2 * | 2/2006 | Song et al. | 455/450 |
| 7,098,801 B1 * | 8/2006 | Burness | 340/815.4 |
| 7,774,578 B2 * | 8/2010 | Keltcher | 711/213 |
| 2006/0274898 A1 * | 12/2006 | Pedlow, Jr. | 380/277 |
| 2006/0293768 A1 * | 12/2006 | Rogers et al. | 700/86 |
| 2007/0105573 A1 * | 5/2007 | Gupta et al. | 455/509 |

* cited by examiner

*Primary Examiner* — Andrew Chriss
*Assistant Examiner* — Jamal Javaid
(74) *Attorney, Agent, or Firm* — Troy A. Van Aacken; Robert J. Starr

(57) ABSTRACT

A name that means something to a human can be used to provision multiple channels, multiple times after a one-time association of an binary integer mask bit pattern with the name, or mnemonic. Typically, the one performing the one-time association of the mask pattern with the mnemonic will choose a name that reflects the channel attributes represented by the mask pattern. Thus, rather than remembering a bit pattern for a single attribute, or even the more difficult task of remembering the pattern for multiple attributes, and having to make sure a '1' is placed in a correct bit position among many '0's when entering bit patterns, the one provisioning only enters a mnemonic that textually refers to the attribute, or attributes, to be provisioned for a given channel.

10 Claims, 3 Drawing Sheets

FIG. 3

Table 22:

| MNEMONIC | MASK BIT PATTERN |
|---|---|
| BONDED | 1000000000000000000000000000000 |
| LOW LATENTCY | 0100000000000000000000000000000 |
| HIGH AVAILABLE UP | 0010000000000000000000000000000 |
| HIGH AVAILABLE DN | 0001000000000000000000000000000 |
| BOND/LL/HIGH AVAIL | 1110000000000000000000000000000 |
| LOW LATENT/HIGH AVAIL | 0110000000000000000000000000000 |
| L LAT/H AVAIL/VIDEO/DN | 0101000000000000000000000000000 |
| L LAT/H AVAIL/VOICE/UP | 0100100000000000000000000000000 |
| BOND/LOW LATEN/HD/DN | 1101000000000000000000000000000 |
| BOND/H. AVAIL/DATA/UP | 1010000000001000000000000000000 |

Table 16:

| CHANNEL | CHANNEL ATTRIBUTE INTEGER VALUE |
|---|---|
| 2 | 1000000000000000000000000000000 |
| 3 | 0010000000000000000000000000000 |
| 4 | 1100000000000000000000000000000 |
| 5 | 0100000000010000000000000000000 |
| 6 | 0100000000001000000000000000000 |
| 7 | 1000000000000000000000000000000 |
| 7 | 0100000000000000000000000000000 |
| 7 | 0010000000000000000000000000000 |
| 8 | 0010000000000000000000000000000 |
| 9 | 1100000000001000000000000000000 |

METHOD AND SYSTEM FOR USING MNEMONIC SYMBOLS TO PROVISION CHANNEL ATTRIBUTES WITH AN ATTRIBUTE MASK

CROSS REFERENCE TO RELATED APPLICATION

This application claims priority under 35 U.S.C. 119(e) to the benefit of the filing date of Hanks, U.S. provisional patent application No. 60/890,788 entitled "Nmemonic symbol attribute mask," which was filed Feb. 20, 2007, and is incorporated herein by reference in its entirety.

FIELD OF THE INVENTION

This invention relates, generally, to network communication devices, and, more particularly to provisioning attribute masks using mnemonic symbols.

BACKGROUND

The Data Over Cable Service Interface Specification ("DOCSIS") specifies certain methods and procedures for characterizing a communication channel according to various attributes. For example, a 32-bit type-length value ("TLV") may be received in a configuration file at a cable modem ("CM") during the ranging and registering process with a cable modem termination system ("CMTS"), which communicates with the CM over a hybrid fiber coaxial ("HFC") network. At the CMTS, one or more attribute masks may be stored in a database. Each upstream and downstream communication channel that the CMTS may manage between it and multiple CMs is associated with one or more attribute masks, which are also typically 32-bit integers.

One or more particular bit positions in a channel attribute mask typically correspond to a particular attribute of the channel. For example, the value in the most significant bit in the 32-bit mask may represent whether the channel can bond together with other channels as a single service flow, as described in more detail below. Values in the next two most significant bits may represent whether the channel is a high availability channel and whether the channel is a low latency channel or not. A typical bit assignment is shown in FIG. 1, where bit 0 signifies that a channel can be part of a bonded service, and if the integer value represented by the drawing in FIG. 1 represents a group of channels, bit 0 would signify that the resources over which the service flow will be transmitted is a bonded group of channels. Bit 1 represents that a channel, or bonded group of channels has low latency characteristics used for high quality of service, typically for voice traffic, or other traffic that needs minimum guaranteed bandwidth. Presently, according to DOCSIS, bits 3-15 are reserved for future attributes and bits 16-31, may be used by a user or a cable company operator, which may also be referred to as a multiple services operator ("MSO").

The 32-bit channel attribute mask integers are typically stored at a first database at the CMTS. When the CMTS receives a service flow request from a CM, the CMTS compares a TLV integer received in the service flow request with the attribute masks of all of the available channels it manages. The CMTS assigns the requesting CM to one of the channels that is characterized by the attribute mask, or masks, that represent the attributes that are also represented in the TLV included in the service flow request.

As briefly referred to above, the DOCSIS version 3.0 and ("MULPIv3"), including higher versions ("DOCSIS 3.x+") specification introduced the concept of user-defined attributes. According to MULPIv3, some of these attributes are defined by the standards specification and some are defined by the individual MSO. Attributes are applied, either automatically or through operator provisioning, to each logical upstream or downstream channel of a cable modem termination system ("CMTS") as well as to each set of channels which form a "bonding group." Once attributes are assigned to each resource, a resource being a given channel or group of channels, subsequent service requests can specify attributes which are either desired or not desired with respect to a requested resource.

MULPIv3.0 specifies that the entire set of attributes are reflected within the bits of a single 32-bit unsigned integer value as shown in FIG. 1. MULPIv3.0 defines attributes which the CMTS is expected to manage for bits 0 thru 2 and reserves bits 3-15 for future standards use. Bits 16 thru 31 are open to definition by an individual MSO. One might expect that the attribute encoding schema would probably be different for different MSOs.

While MULPIv3.0 defines the operations to be performed on these attribute masks, it does not specify any support for defining or manipulating individual attributes within the attribute masks themselves. The text of MULPIv3.0 and OSSIv3.0 treat attribute bit masks as unsigned integers—an encoding which is very difficult for a human to work with because of the difficulty in remembering which pattern of 32 ones and zeros represents which attribute, or combination of attributes—especially when the high-order bits are set. Thus, there is a need in the art for a human-friendly method and system for defining the attributes of a channel attribute mask. Further, there is a need in the art for a human-friendly method and system for selecting which attribute masks will define a given channel, or group of channels.

BRIEF DESCRIPTION OF DRAWINGS

FIG. 3 illustrates a first table and a second table used for provisioning channel attributes using mnemonic symbols.

DETAILED DESCRIPTION

As a preliminary matter, it readily will be understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full, and enabling disclosure of the invention. The disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
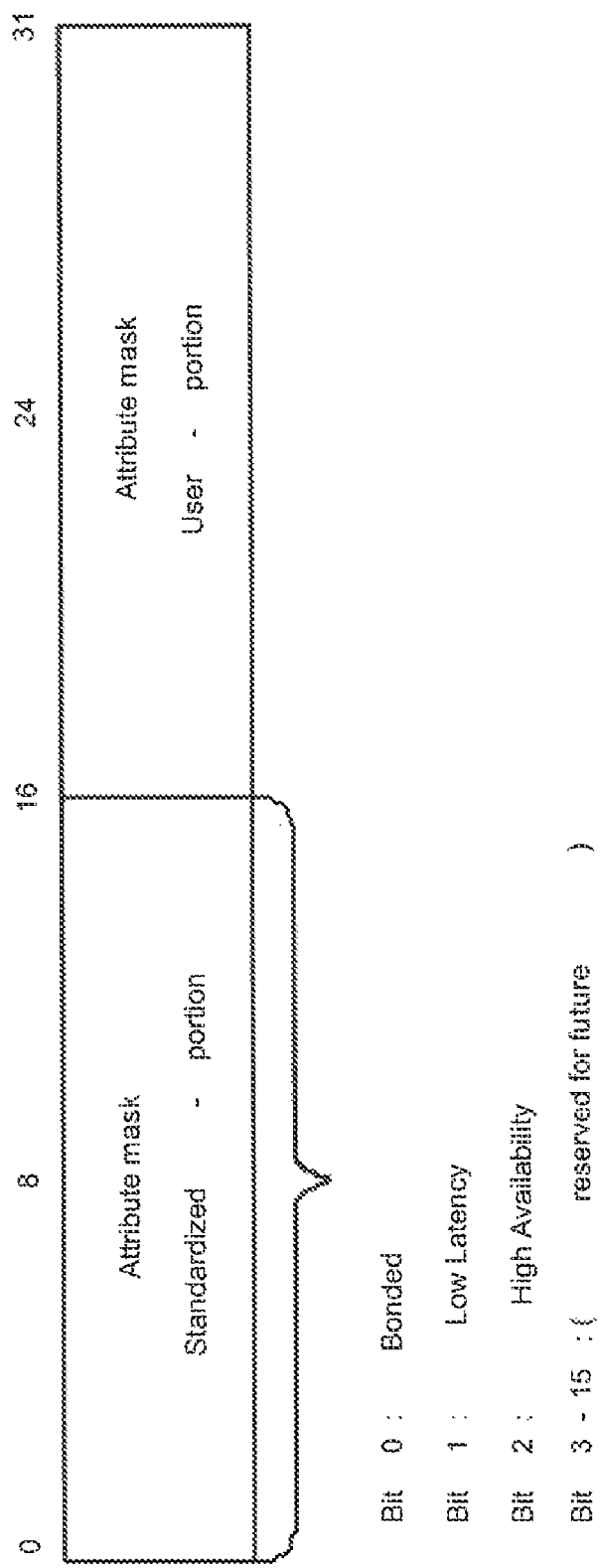
FIG. 1 illustrates a bit pattern mapping of attribute bits in a channel attribute mask.
Figure 2:
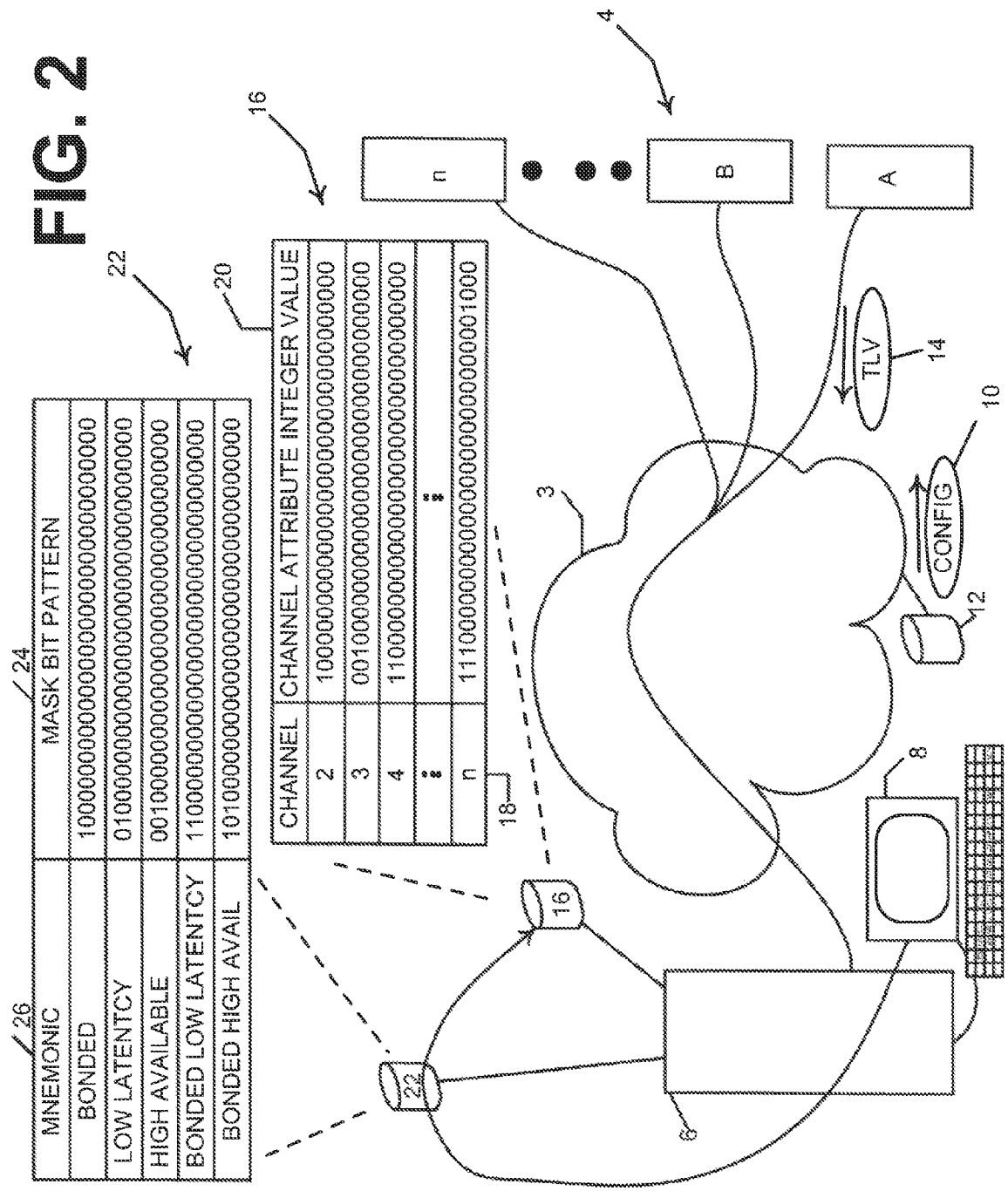
FIG. 2 illustrates a human-friendly method and system for defining and selecting a combination of channel attribute provisioning mask.

Turning now to FIG. 2, system 2 includes a hybrid fiber coaxial network ("HFC") 3 that couples user devices 4A-n, such as, for example, cable modems ("CM") and/or media terminal devices ("MTA") (a CM and an EMTA may be combined into a single device often referred to as an embedded media terminal device ("EMTA") to central device 6, such as, for example, a cable modem termination system ("CMTS"). An input device 8, such as a personal computer ("PC"), may be used to enter control and operation information, control loading of operation software, and other functions, and to provide an interface for entering information into operating software for CMTS 6.

When any of user devices 4A-n range and register with central device 6, a configuration file 10 may be sent from configuration file server 12 to a ranging and registering device 4. Configuration file 10 may contain the channel requirements for certain services that the CM/EMTA is authorized to perform. For example, if a device's user has paid for telephony service, configuration file 10 may instruct the EMTA 4 that it needs a channel between it and CMTS 6 over HFC 3 that has low latency for transporting telephony calls. This channel requirement information may be contained in an information format, such as in a type length value, or in a management information base ("MIB") variable.

The channel requirement information contained in the MIB variable, for example, may be a binary integer, typically a thirty two bit binary integer. After receiving the configuration file, when the user device attempts to initiate a call, it requests an upstream channel and a downstream channel with CMTS 6 that both have low latency. Whichever device 4 initiates a call sends the channel requirement to CMTS 6 in the form of a thirty-two bit TLV 14. CMTS 6 compares the thirty-two bit integer contained in TLV 14 with channel attribute integers contained in a first table 16, which may be referred to as a channel attribute table. Channel attribute table 16 associates each channel number 18, which represent channels over which CMTS 6 communicates with user devices 4, with channel attributes represented by channel attribute integer values 20. The channel attribute(s) of each channel supported by CMTS 6 is/are provisioned before the channel(s) is/are assigned used. Provisioning typically includes generating, or updating, first table 16 to create, or update, the association between channel numbers 18 and channel attribute integer values 20.

To provision first table 16, operator personnel, or in the alternative, an automated system, generates second table 22. Second table associates each pattern of bits 24 that represents a channel attribute with a unique mnemonic name, or symbol, 26. Bit patterns 24 may be referred to as masks. The channel attribute masks 24 typically contain integer values that correspond to channel attribute thirty-two bit integer values as described above in reference to the channel attribute integer values 20 of first table 16.

To facilitate ease of provisioning of first table 20, a user may create mnemonics that serve to help a human remember and identify channel attributes to associate with the channel numbers 18. For example, in the first data line of second table 22 illustrated in FIG. 2, a '1' in the most significant place of the binary integer mask 24 indicates that a channel associated with the integer can be combined with other channels that also have a '1' in the most significant position into a bonding group, which is described in greater detail in the DOCSIS 3.x+, as discussed above. Thus, instead of personnel for a given MSO having to enter 10000000000000000000000000000000 into an interface, such as, for example, a command line interface, a SIP interface, or similar means for entering data into CMTS that is operating on PC 8, the user need only remember that to provision a channel for bonded flow, he or she only has to enter the mnemonic 'BONDED'. After entering 'BONDED' and a channel number, for example '2', as shown by the example in FIG. 2, the integer value 10000000000000000000000000000000 is associated with channel number 2 in first table 16. In addition, a mask bit pattern may also define characteristics for a group of channels that have been bonded together as discussed above.

It will be appreciated that the steps of associating a bit pattern mask with a mnemonic symbol in second table 22 and associating a channel attribute integer value 20 with a channel number in first table 16 are typically two different steps and may be performed at different times. However, it will be appreciated that the creating of, or updating of, first tables 16 and 22 may be performed in any order with respect to one another. However, to use a mnemonic to provision a channel in first table 16, second table would typically be created first. Further examples of mask patterns associated with examples of corresponding mnemonics in second table 22 are shown in FIG. 2. In addition, an example in first table 16 shows that two different mask, or attribute values, can be combined into one channel attribute in first table and second table 16 and 22 respectively. For example, the mnemonic 'BONDED LOW LATENCY' stands for both the attributes of being capable of bonded flow and of having a low latency as shown by the first and second most significant bits having '1' in their respective positions in the mask bit pattern in second table 22 and in the integer value in first table 16 for channel 4. Thus, an operator initializing and provisioning channels on a new CMTS 6, for example, can choose the mnemonic 'BONDED LOW LATENCY' to represent '11000000000000000000000000000000' in second table 22. The operator personnel would only enter '11000000000000000000000000000000' once, and software at interface 8 would associate the chosen mnemonic with mask bit pattern in second table 22. Then, the operator personnel could provision channel 4 and any other channel that is to have the attributes of being capable of being in a bonding group and also of having low latency, by entering into interface 8 'BONDED LOW LATENCY' rather than '11000000000000000000000000000000' for each channel having this combination of attributes.

Turning now to FIG. 3, an expanded version of second table 22 and first table 16 with respect to the same tables shown in FIG. 2 is shown. These tables shown in FIG. 3 provide embodiments of certain aspects. For example, the mnemonic symbol 'BONDED' is associated in second table 22 with a single-attribute bit pattern having a one in the most significant place of the binary integer and all the rest of the places in the integer are zero. Looking in first table 16 shows that channel 2 has been provisioned with an attribute integer value having a one in the most significant place and all the rest of the places are zero. Thus, operator personnel may have entered at one step into an interface the bit pattern '10000000000000000000000000000000' and associated it, using the interface, with the mnemonic 'BONDED'.

Then, at another step, the operator may have accessed an input screen to provision a channel having the channel number 2. After accessing the input screen of the interface for channel 2, the operator may have entered the mnemonic 'BONDED' rather than entering '10000000000000000000000000000000', which he or she could also have done. However, remembering 'BONDED' rather than '10000000000000000000000000000000' is easier and thus more human friendly. Similarly, single-attribute bit mask '01000000000000000000000000000000' is associated with mnemonic 'LOW LATENCY' in second table 22. Thus, and operator entering 'LOW LATENCY' in a mnemonic input field of a provisioning software interface could provision one of the attributes of channel 7, as shown in first table 16.

It will be appreciated that channel 7 has been provisioned using three different mask bit patterns from second table 22. Thus, to provision channel 7, an operator may have entered a mnemonic three different time, or into three different mnemonic fields on the same input screen when provisioning channel 7. The three mnemonics entered would have been 'BONDED', 'LOW LATENCY' and HIGH AVAILABLE UP', which is a mnemonic used only to provision upstream channels with high availability. Thus, channel 7 is an upstream channel in the example shown in the figure.

Another aspect is that the multiple-attribute bit patterns may be associated with a single mnemonic, thus entering a single mnemonic into an input screen for a given channel to be provisioned provisions multiple attributes. For example, FIG. 3 shows that in second table 22, '0110000000000000000000000000000' is associated with the mnemonic 'LOW LATENT/HIGH AVAIL,' Thus, entering 'LOW LATENT/HIGH AVAIL' into a provisioning input screen for provisioning channel 4 provisions the channel for the attributes of low latency and high availability. Both of these are attributes that may be desirable for a channel used for transporting voice calls.

Another aspect is that the same mask bit pattern may be associated with two different mnemonics, which are used to provision an upstream and a downstream channel separately. In one example, mask pattern '0010000000000000000000000000000' is associated with the mnemonics 'HIGH AVAIL UP' and 'HIGH AVAIL DN' in second table 22. Thus, as discussed above, channel 7 is provisioned as an upstream channel in first table 16. Channel 8 maybe a downstream channel. Thus, mnemonic 'HIGH AVAIL DN' may have been used to provision channel 7 and mnemonic HIGH AVAIL DN may have been used top provision channel 8 if it is a downstream channel.

Another aspect is that in a multi-attribute bit pattern mask, one of the sixteen least significant bits can be used to represent different attributes depending on which direction, either upstream or downstream, the channel operates. For example, in second table 22, '0100000000000001000000000000000' is associated with mnemonic 'L LAT/H AVAIL/VIDEO/DN' and also with mnemonic 'L LAT/H AVAIL/VOICE/UP'. Thus, for example, an upstream channel provisioned to have channel attribute integer value '0100000000000001000000000000000' would have attributes of low latency, high availability and be used for voice only. A downstream channel provisioned with '0100000000000001000000000000000' may have channel attributes of low latency, high availability and be used for downstream video only. As shown in the figure either channel 5 or 6 could be provisioned using either of these mnemonics, depending on which direction the channel operates.

Other aspects are shown in FIG. 3, and even other aspects for use of mnemonics in provisioning channel attributes that have not been discussed above or shown in the drawings are conceivable. A benefit of using mnemonics is that a name that means something to a human can be used to provision multiple channels and multiple times after a one-time association of a binary integer mask bit pattern with the name, or mnemonic. Typically, the one performing the one-time association of the mask pattern with the mnemonic will choose a name that reflects the channel attributes represented by the mask pattern. Thus, rather than remembering a bit pattern for a single attribute, or even the more difficult task of remembering the pattern for multiple attributes, and having to make sure a '1' is placed in a correct bit position among many '0's when entering bit patterns, the one provisioning only enters a mnemonic that textually refers to the attribute, or attributes, to be provisioned for a given channel. It will be appreciated that the mnemonics used in the drawings and description above were selected for illustrative purposes and to fit into the respective cells of second table 22 in the drawing. Longer, or shorter, mnemonics that could be more descriptive could be used instead of the ones given for example to represent the same masks and corresponding attributes as shown in the figures.

What is claimed is:

1. A human-friendly method for managing a plurality of resources comprising:
    associating one or more of a plurality of integer encoding values with each of the plurality of resources, wherein the plurality of resources comprise channels or channel groups of a communication network;
    defining operator provisioned attribute mask bit patterns from a set of possible resource attribute mask bit patterns to be associated with each of the plurality of resources;
    associating each of the defined attribute mask bit patterns that represents a resource attribute mask of interest to a service operator with a unique mnemonic symbol from among a plurality of unique mnemonic symbols, wherein one or more of the plurality of unique mnemonic symbols associated with multiple-attribute bit patterns correspond to only one direction of transmission over a channel; and
    provisioning a requested service over one or more of the resources, to a requesting device based on a result of a comparison of the one or more attribute mask bit patterns that correspond to the integer encoding value, or values, of the resources over which the requested service is being provisioned in order to designate the resources as suitable for a particular application service associated with the requested service with an associated prerequisite resource requirement.

2. The method of claim 1 wherein each of the mnemonic symbols is associated with a unique single-attribute provisioning masks, an attribute provisioning mask representing an integer encoded value that represents attributes of one of a plurality of channels of the communication network.

3. The method of claim 1 wherein one or more of the mnemonic symbols that is associated with single-attribute provisioning mask bit patterns corresponds to either upstream channels from the customer to the network or downstream channels from the network to the customer, but not both channel directions.

4. The method of claim 1 wherein a single direction single-attribute provisioning mask bit pattern is associated with different mnemonic symbols for different channel directions.

5. The method of claim 1 wherein one or more mnemonic symbols associated with multiple-attribute bit patterns correspond to only one direction of transmission over a channel.

6. The method of claim 1 wherein one or more multiple-attribute bit patterns correspond to more than one direction of transmission.

7. A system for managing a plurality of resources comprising:
    an interface operable to be used to associate one or more of a plurality of integer encoding values with each of the plurality of resources, wherein the plurality of resources comprise channels or channel groups of a communication network;

an interface operable to defining define provisioned attribute mask bit patterns from a set of possible resource attribute mask bit patterns to be associated with each of the plurality of resources;

an interface operable to be used by a service operator to associate each of the defined attribute mask bit patterns that represents a channel attribute with a unique mnemonic symbol selected from among a plurality of mnemonic symbols, wherein one or more of the plurality of unique mnemonic symbols associated with multiple-attribute bit patterns correspond to only one direction of transmission over a channel;

an interface operable to facilitate service operator selection of a selected unique mnemonic symbol from among the plurality of mnemonic symbols, the selected unique mnemonic symbol corresponding to one or more desired integer encoding values for the requested service; and an interface operable to provision a requested service over one of the channels, or a group of the channels, of the resources to a requested device based on a result of a comparison of the one or more mask bit patterns that correspond to the selected unique mnemonic symbol to the integer encoding value, or values, of the channel, or group of channels, of the resources over which the requested service is being provisioned in order to designate the resources as suitable for a particular application service associated with the requested service with an associated prerequisite resource requirement.

8. The system of claim 7 further comprising a computer program for comparing integer encoding values that correspond to one or more of the plurality of channels with a channel attribute integer value received from a requesting user device and for assigning one or more channels to the requesting user device based on the results of the comparison.

9. A computer-implemented method for managing a plurality of resources comprising:

receiving a request for a selected bitmask associated with a channel selected from among a plurality of channels, the selected bitmask comprising a plurality of integer encoded values identifying the attributes associated with a selected channel or group of channels of the plurality of resources;

retrieving a selected bitmask associated with the request in order to designate the resources as suitable for a particular application service associated with the request with an associated prerequisite resource requirement;

comparing the selected bitmask to a plurality of predefined bitmasks, each predefined bitmask being associated with a plurality of respective mnemonic identifier for the predefined bitmask, wherein one or more of the plurality of mnemonic identifiers associated with multiple-attribute bit patterns correspond to only one direction of transmission over a channel;

identifying the mnemonic identifier associated with the selected bitmask; and comparing integer encoding values that correspond to one or more of the plurality of channels of the plurality of resources with a channel attribute integer value received from the received request and assigning one or more channels of the plurality of resources to a user associated with the received request based on the results of the comparison; and displaying the mnemonic identifier associated with the selected bitmask to a human-user, thereby facilitating the human-user's ability to interpret the selected bitmask.

10. The computer-implemented method of claim 9, further comprising:

if a predetermined bitmask does not match the selected bitmask, identifying a combination of predefined bitmasks that match the selected bitmask when the bitmasks are combined; and displaying the combination of predefined bitmasks to the human-user to facilitate the human-user's ability to interpret the selected bitmask.

* * * * *